United States Patent
Wang

(10) Patent No.: US 10,259,170 B2
(45) Date of Patent: Apr. 16, 2019

(54) METHODS FOR JOINING POLYMERIC COMPOSITES USING A HYBRID FRICTION/ULTRASOUND TECHNIQUE FOR ACHIEVING DESIRED WELD CHARACTERISTICS

(71) Applicant: GM GLOBAL TECHNOLOGY OPERATIONS LLC, Detroit, MI (US)

(72) Inventor: Pei-Chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/991,266

(22) Filed: May 29, 2018

(65) Prior Publication Data
US 2018/0272619 A1 Sep. 27, 2018

Related U.S. Application Data

(62) Division of application No. 14/476,213, filed on Sep. 3, 2014, now Pat. No. 9,987,796.
(Continued)

(51) Int. Cl.
*B29C 65/00* (2006.01)
*B29C 65/08* (2006.01)
(Continued)

(52) U.S. Cl.
CPC ........ *B29C 66/022* (2013.01); *B29C 65/0681* (2013.01); *B29C 65/08* (2013.01);
(Continued)

(58) Field of Classification Search
CPC ......... B29C 66/00; B29C 66/02; B29C 66/02; B29C 66/022; B29C 66/003; B29C 66/10; B29C 66/11; B29C 66/11; B29C 66/112; B29C 66/112; B29C 66/1122; B29C 66/14; B29C 66/20; B29C 66/21; B29C 66/30; B29C 66/32; B29C 66/34; B29C 66/34; B29C 66/345; B29C 66/345; B29C 66/3452; B29C 66/40; B29C 66/41; B29C 66/70; B29C 66/72; B29C 66/72; B29C 66/721; B29C 66/73; B29C 66/73; B29C 66/739; B29C 66/739; B29C 66/7392; B29C 66/80; B29C 66/81; B29C 66/81; B29C 66/814; B29C 66/814;
(Continued)

(56) References Cited

U.S. PATENT DOCUMENTS

| | | | | |
|---|---|---|---|---|
| 4,457,795 A | * | 7/1984 | Mason | ................ B29C 65/0672 156/294 |
| 6,199,745 B1 | * | 3/2001 | Campbell | ............ B23K 20/123 228/112.1 |

* cited by examiner

*Primary Examiner* — Jacob T Minskey
*Assistant Examiner* — Matthew Hoover
(74) *Attorney, Agent, or Firm* — Tiffany N. Logan; Parks IP Law LLC

(57) ABSTRACT

A method for use in efficiently joining together multiple workpieces to inhibit establishment of weld material in unwanted areas. The method uses a hybrid shaping-and-energizing system having a shaping tool and an ultrasonic horn. The method positions the hybrid shaping-and-energizing system proximate a workpiece, uses the shaping tool to form at least one recess in the proximate workpiece, and applies weld energy to the proximate workpiece using the ultrasonic horn. The recess is formed and the weld energy applied such that molten workpiece material becomes disposed within the recess, thereby inhibiting formation of weld material in the unwanted areas.

20 Claims, 7 Drawing Sheets

Related U.S. Application Data

(60) Provisional application No. 61/874,403, filed on Sep. 6, 2013.

(51) Int. Cl.

| | | |
|---|---|---|
| *B29C 65/06* | (2006.01) | |
| *B29C 65/16* | (2006.01) | |
| *B29C 65/72* | (2006.01) | |
| *B29C 65/18* | (2006.01) | |
| B29K 101/12 | (2006.01) | |
| B29K 105/00 | (2006.01) | |
| B29K 23/00 | (2006.01) | |
| B29K 67/00 | (2006.01) | |

(52) U.S. Cl.
CPC .............. *B29C 65/16* (2013.01); *B29C 65/18* (2013.01); *B29C 65/72* (2013.01); *B29C 66/003* (2013.01); *B29C 66/1122* (2013.01); *B29C 66/14* (2013.01); *B29C 66/21* (2013.01); *B29C 66/32* (2013.01); *B29C 66/3452* (2013.01); *B29C 66/41* (2013.01); *B29C 66/721* (2013.01); *B29C 66/7392* (2013.01); *B29C 66/81463* (2013.01); *B29C 66/8248* (2013.01); *B29C 66/8322* (2013.01); *B29C 66/0242* (2013.01); *B29C 66/0246* (2013.01); *B29C 66/45* (2013.01); *B29C 66/71* (2013.01); *B29C 66/712* (2013.01); *B29C 66/7212* (2013.01); *B29C 66/742* (2013.01); *B29C 66/7422* (2013.01); *B29C 66/74283* (2013.01); *B29C 66/8161* (2013.01); *B29C 66/8227* (2013.01); *B29K 2023/065* (2013.01); *B29K 2067/006* (2013.01); *B29K 2101/12* (2013.01); *B29K 2105/253* (2013.01); *Y10T 156/14* (2015.01)

(58) Field of Classification Search
CPC ............ B29C 66/8146; B29C 66/8146; B29C 66/81463; B29C 66/82; B29C 66/82; B29C 66/824; B29C 66/824; B29C 66/8248; B29C 66/83; B29C 66/83; B29C 66/832; B29C 66/832; B29C 66/8322; B29C 65/00; B29C 65/06; B29C 65/06; B29C 65/068; B29C 65/068; B29C 65/0681; B29C 65/08; B29C 65/10; B29C 65/16; B29C 65/18; B29C 65/70; B29C 65/72

See application file for complete search history.

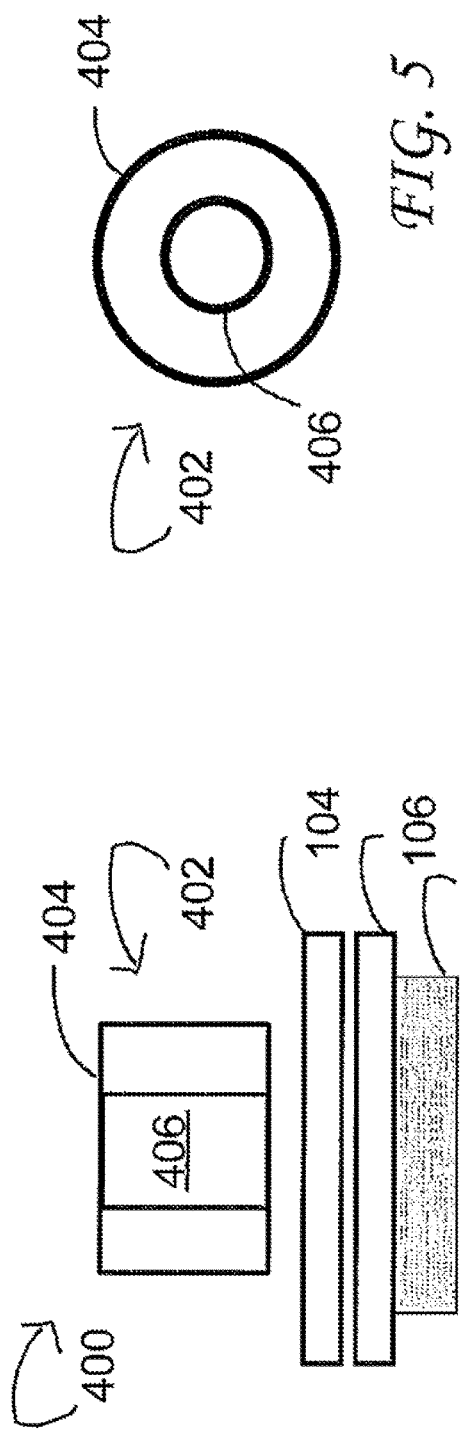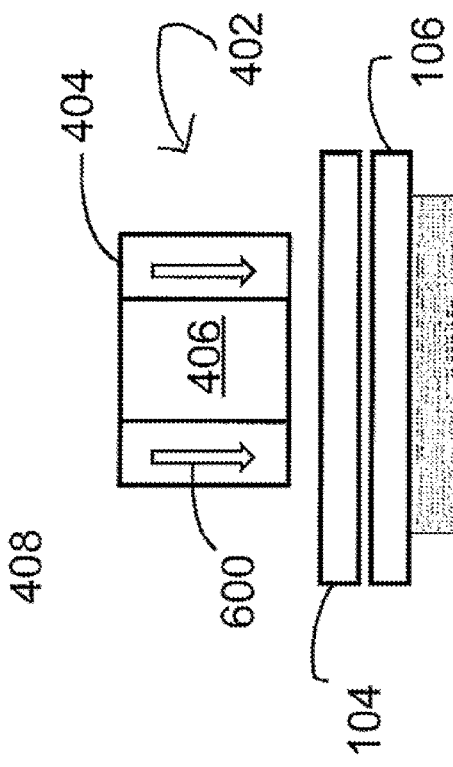

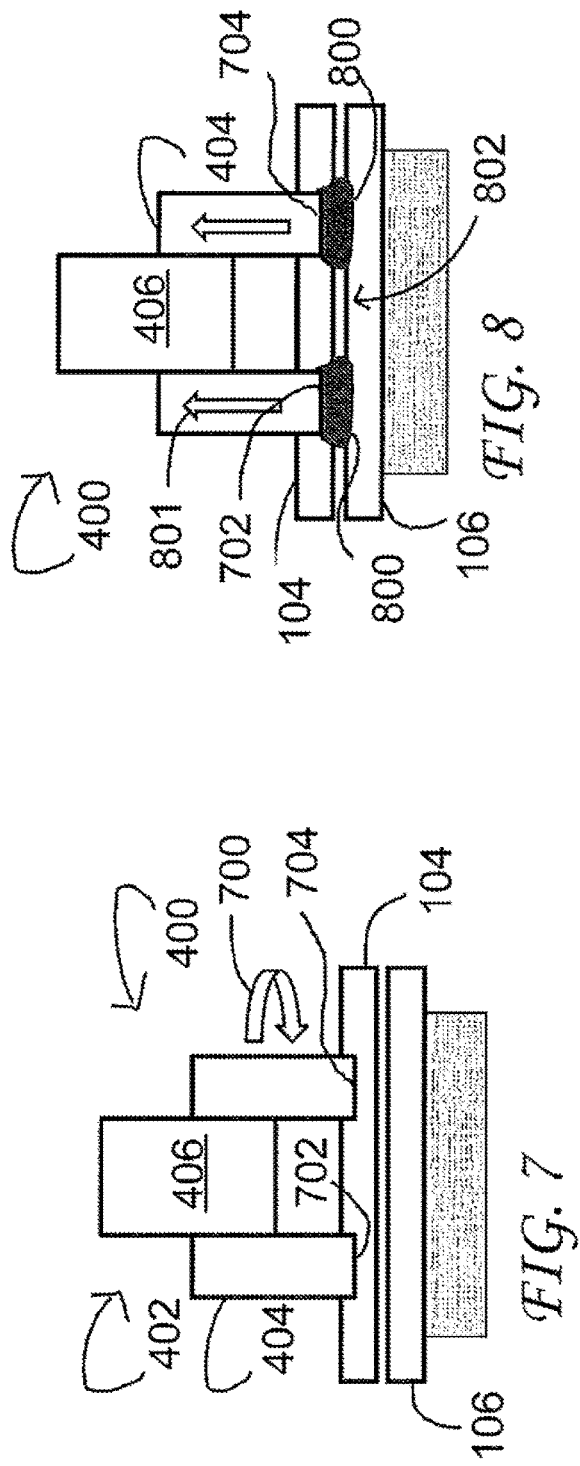
FIG. 7
FIG. 8
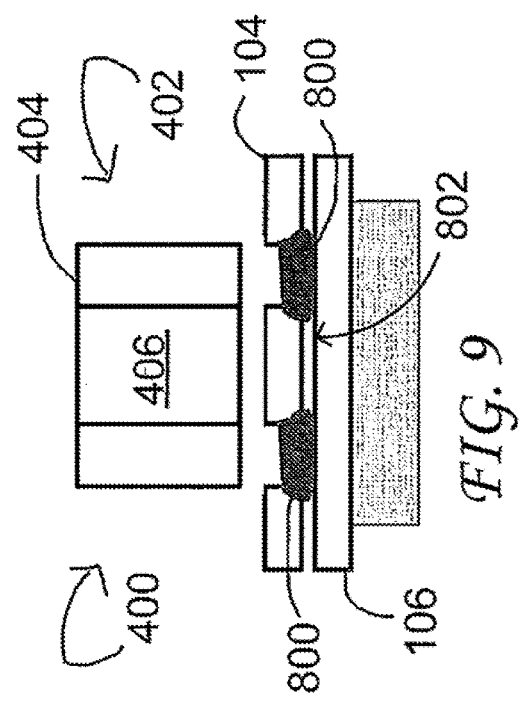
FIG. 9

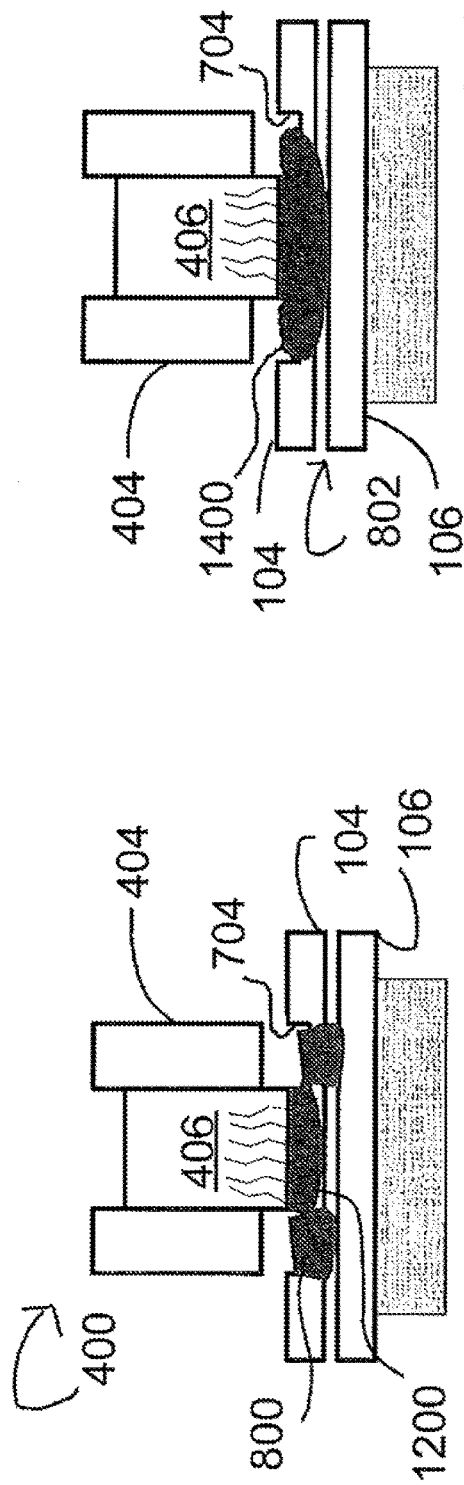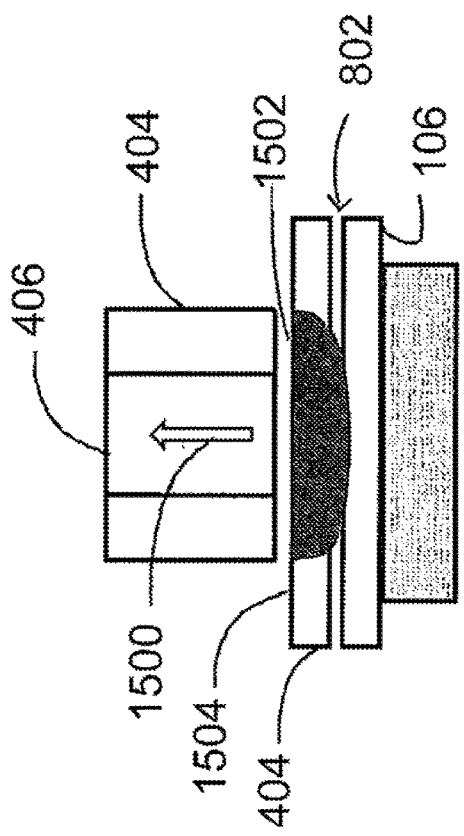

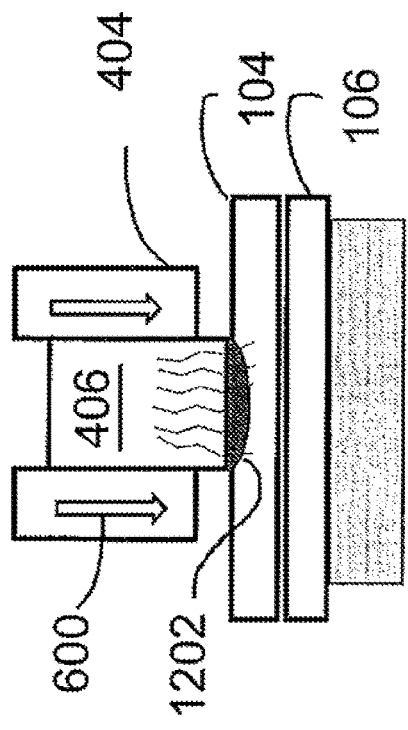
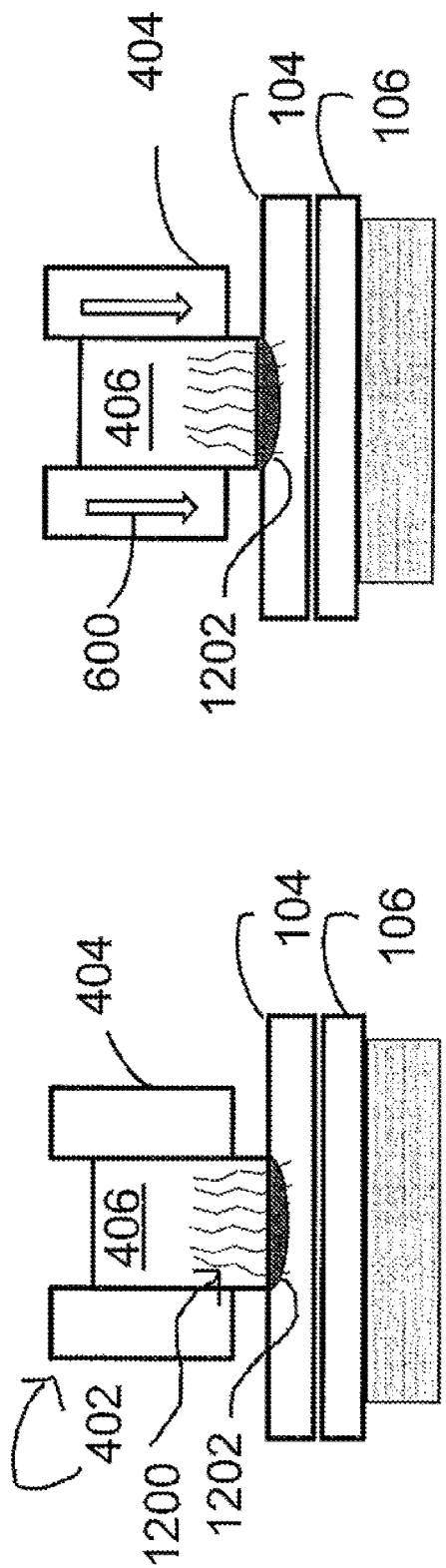
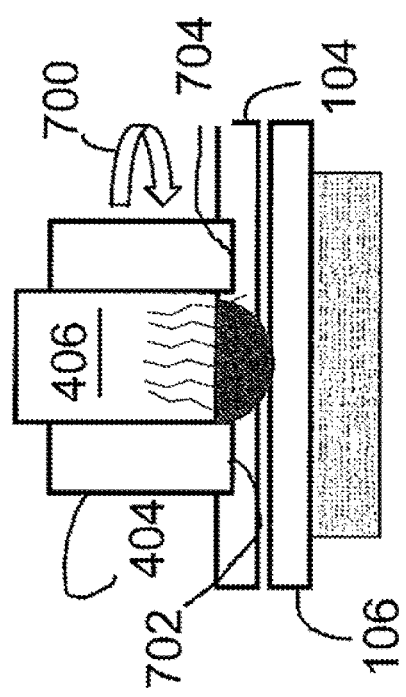

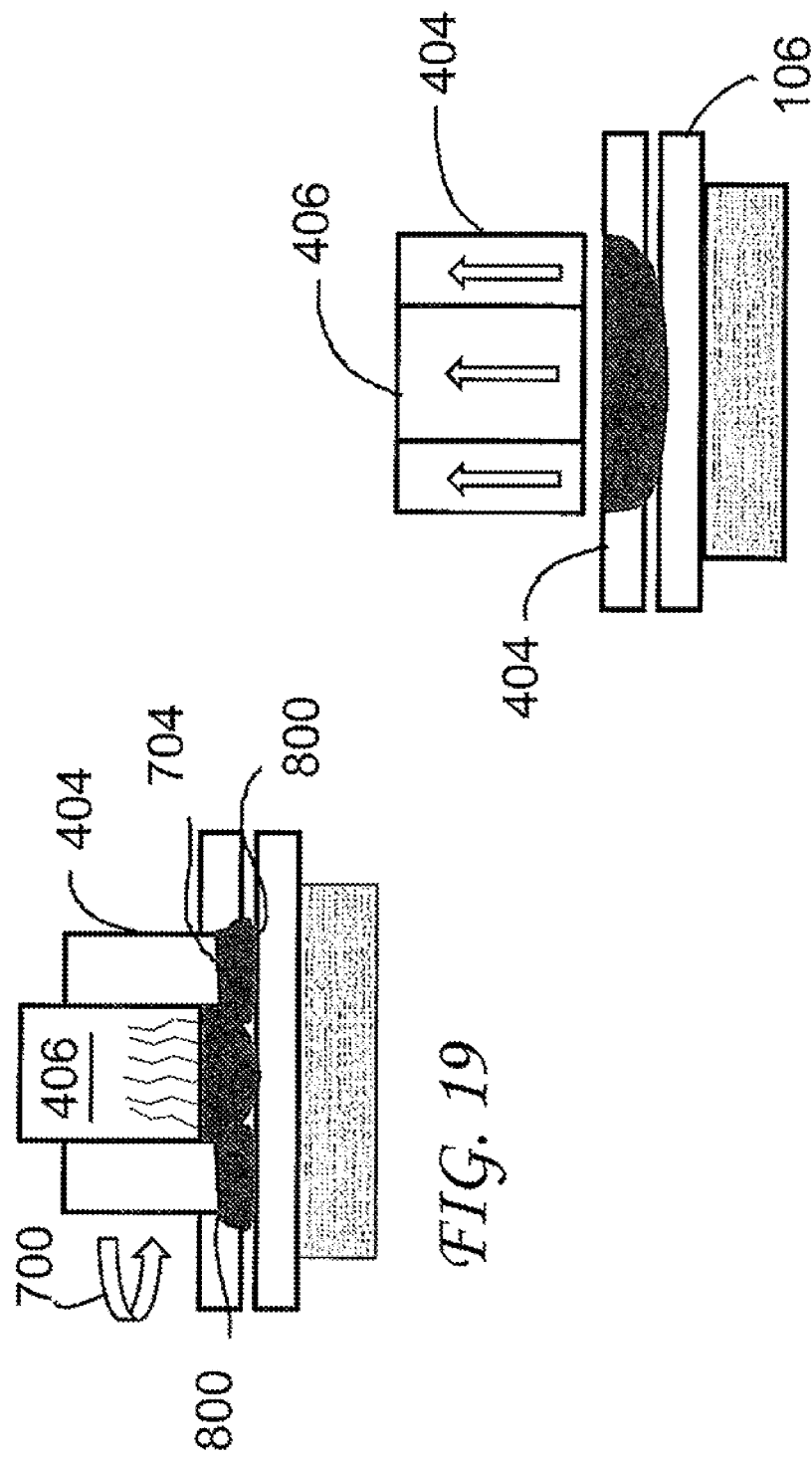

METHODS FOR JOINING POLYMERIC COMPOSITES USING A HYBRID FRICTION/ULTRASOUND TECHNIQUE FOR ACHIEVING DESIRED WELD CHARACTERISTICS

CROSS-REFERENCE TO RELATED APPLICATIONS

The present application is a divisional of U.S. patent application Ser. No. 14/476,213, filed on Sep. 3, 2014, which claims the benefit of U.S. Provisional Patent Application No. 61/874,403, filed on Sep. 6, 2013, the content of which is incorporated herein in its entirety.

TECHNICAL FIELD

The present disclosure relates generally to joining polymeric composites and, more particularly, to an apparatus and methods for joining composites using a hybrid joining technique involving applying friction and ultrasonic energy to the workpieces being joined. The friction and ultrasonic operations can be performed in any order and at times simultaneously, according to embodiments of the technology.

BACKGROUND

In automotive manufacturing, polymeric composites are being used increasingly due to their favorable characteristics, including being lightweight, highly-conformable or shapeable, strong, and durable. Some composites are further colorable and can be finished to have most any desired texture.

The increased use in automobiles includes, for instance, in instrument and door panels, lamps, air ducts, steering wheels, upholstery, truck beds or other vehicle storage compartments, upholstery, external parts, and even engine components. Regarding engine components, and other under-the-hood (or, UTH) applications, for instance, polymers are configured, and being developed continuously, that can withstand a hot and/or chemically aggressive environment. Regarding external parts, such as fenders, polymers are being developed that are online paintability and have high heat and chemical resistance over longer periods of time. And many other potential usages in automotive applications are being considered continuously.

With this trend, finding ways to efficiently and effectively join polymer components is becoming progressively important. Compression molding and post-mold joining techniques—e.g., ultrasonic welding—are being used more commonly.

Traditional techniques have various shortcomings. With reference to the figures, and more particularly the first figure, FIG. 1 shows schematically a conventional ultrasonic welding arrangement 100 including a welding horn 102 and two workpieces 104, 106 prior to welding.

In the illustrated step, the horn 102 is lowered, as indicated by down arrow, toward contacting a top workpiece 104 of the two. Once in contact with the piece 104, an ultrasonic generator connected to the horn excites high-frequency ultrasonic vibrations, which are passed through the horn to the piece. At the interface heat is generated and the workpiece 104 begins to melt 200, as shown in FIG. 2.

FIG. 3 shows the arrangement 100 after it has been melted sufficiently for the molten material of the workpieces to connect the pieces 104, 106 at a joint 300.

The technique has shortcomings including the formation of unwanted excess, or squeeze-out, workpiece material 302 on the top surface of the proximate workpiece 104. The excess material develops at least in part because the workpiece material expands as it melts.

One option for handling this situation is to remove the excess material 302 from the now-welded workpiece arrangement. This cleaning is of course time consuming, eating up critical cycle time in the manufacturing process. Another shortcoming to this option is the energy—e.g., manpower or robotic resources, to perform the cleaning.

The cleaning can also add significant other cost, such as cost of purchase, customizing (programming, etc.), and maintenance of cutting machinery—e.g., blade-based, or light-based cutting tools.

Further challenges arise whether cleaning the excess 302 prior to or after the excess has cooled. Whether the excess has hardened by cooling, special care would need to be taken to ensure that the material 302 is removed without affecting the balance of the cooling or cooled material undesirably. Upsetting a surface portion of the cooling or cooled material could affect cosmetic quality of the resulting part. It is also contemplated that rough removal of the excess 302, such as by chipping at the material after hardening, could upset an integrity of the connection 300.

Another alternative is to use ultra-high-power ultrasonic energy. When more ultrasonic energy is used, the top workpiece, and eventually the bottom one, melts more quickly, and so the desired welding 300 is formed more quickly. In this way, less ancillary, lateral, workpiece material is melted, and so less excess material formed. This approach also is cost prohibitive, though. Moreover, excess material could still form.

Still another alternative is conventional mechanical fastening. The workpieces can be screwed together, or connected by nuts and bolts, for instance. These connections have shortcomings including unwanted added weight, unsightly exposed portions of the fasteners, and possibly less-robust joints.

SUMMARY

The present technology relates to a hybrid joining technique including joining composites using a hybrid joining technique involving applying friction and ultrasonic energy to the workpieces being joined. The friction and ultrasonic operations can be performed in any order and at times simultaneously, according to embodiments of the technology. The result is a large and robust weld, especially as compared to conventional techniques.

The technique includes in one embodiment, for instance, mechanically shaping a workpiece in a manner facilitating effective and neat subsequent ultrasonic welding of the workpiece with another workpiece. In a contemplated embodiment, the application of ultrasonic energy is not fully subsequent to the friction application, as the ultrasonic energy application can commence before the friction creation is completed. Friction-induced workpiece melting can occur simultaneously with ultrasound-induced workpiece melting. In either case, each of these approaches may be referred to as friction-assisted ultrasonic welding. Again, the result is a large and robust weld, especially as compared to conventional techniques.

The mechanical shaping in some embodiments melts and/or removes some of the workpiece material, facilitating subsequent ultrasound-induced melting of the workpiece.

The technique in one embodiment includes applying friction after commencement of ultrasonic energy application. In a particular case, friction generation is commenced (e.g., by a shaping tool described further below) after commencement of applying ultrasonic vibrations to at least a proximate one of the workpieces being joined, and before conclusion of the application of the ultrasonic vibrations to the workpiece(s). In this way, too, ultrasound-induced workpiece melting occurs simultaneously with friction-induced melting. In another particular, and contemplated, case, the friction generation is commenced immediately after conclusion of the application of the ultrasonic vibrations to the workpiece(s). The immediacy ensures that the workpiece(s), molten and solid, do not cool, or cool by a minimal degree, thus facilitating the subsequent friction induced melting. And the immediacy in some instances ensures that molten material from the ultrasound operation remains so that the mechanical action of the friction-inducing tool, or results of the mechanical action, can affect that molten material, e.g., stir it, enhance its size, change its shape as desired, and/or other. In any event, each of these approaches may be referred to as ultrasonic-assisted friction welding, ultrasonic-assisted friction stir welding, or the like. And, once again, the result is a large and robust weld, especially as compared to conventional techniques.

Further reference is now made to the afore-mentioned embodiment in which mechanically shaping of a proximate, first, workpiece, of the workpieces being joined, is performed, to facilitate effective and neat subsequent ultrasonic welding of the workpiece with another workpiece. Generally, the shaping involves creating one or more recesses in the first workpieces for accommodating molten workpiece material during the welding. The mechanical shaping in some embodiments melts some of the workpiece material, facilitating subsequent ultrasound-induced melting of the workpiece.

Benefits of the techniques include reduced cycle time in welding, energy and resource savings, and neater resulting parts that are potentially more robust.

Time, energy, and resources are saved by obviating a need to remove from a top workpiece excess workpiece material developing in an undesired position during welding, such as above a primary surface of the workpiece surface.

Cycle time may also be improved by expedited welding via channeling vibrations, and resulting heat, through one or more limited channels. At least one recess may be formed, for instance, so that while primary workpiece material remains directly below the ultrasonic horn, at least some lateral workpiece material, adjacent the primary material, is removed. In this case, the high-frequency (HF) vibrations emitted by the horn, and resulting heat, are channeled more quickly through the primary material to an interface between the pieces being joined, than it would if the adjacent material was not removed—i.e., if the vibrations and heat needed to traverse both the primary and adjacent material in reaching to the interface for welding.

Parts lacking excess material would be cleaner, and parts joined according to the present technology, requiring no excess-material removal, are expected to be cosmetically superior to parts joined under the traditional technique requiring removal.

Other aspects of the present invention will be in part apparent and in part pointed out hereinafter.

DESCRIPTION OF THE DRAWINGS

FIG. 4 illustrates schematically a novel ultrasonic welding arrangement including the two workpieces to be joined and hybrid tooling comprising a shaping tool, or shoulder, surrounding an ultrasonic welding horn, prior to welding, according to an embodiment of the present technology.

FIG. 5 shows a top plan view of the hybrid tooling of FIG. 4.

FIG. 6 shows the arrangement of FIG. 4 indicating a first operation whereby the shoulder is lowered toward a proximate workpiece of the workpieces being joined.

FIG. 7 shows the arrangement after the operation of FIG. 6, and indicates a subsequent operation whereby the shoulder is manipulated, e.g., rotated, to create at least one slot in the proximate workpiece.

FIG. 8 shows the arrangement after the operation of FIG. 7, and indicates a subsequent operation whereby the shoulder is retrieved from its working position at the proximate workpiece.

FIG. 9 shows the arrangement after the operation of FIG. 8, wherein the slot has been formed and the shoulder withdrawn.

FIG. 13 shows the arrangement after the operation of FIG. 12, after sufficient welding is performed to cause molten workpiece material to begin to fill a space created by the shoulder.

FIG. 14 shows the arrangement after the operation of FIG. 13, as welding is continued and molten workpiece material begins to fill substantially most of the space created by the working of the shoulder.

FIG. 15 shows the arrangement upon completion of the welding and retrieval of the ultrasonic weld from the workpieces joined.

FIGS. 16-20 show the system being used according to an alternative embodiment of the present technology.

DETAILED DESCRIPTION

Figure 1:
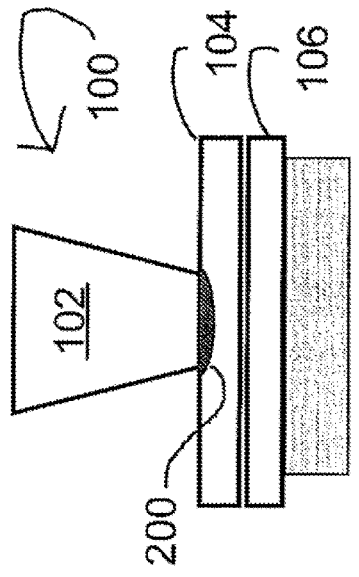
FIG. 1 illustrates schematically a conventional ultrasonic welding arrangement including a welding horn and two workpieces prior to welding them together.
Figure 2:
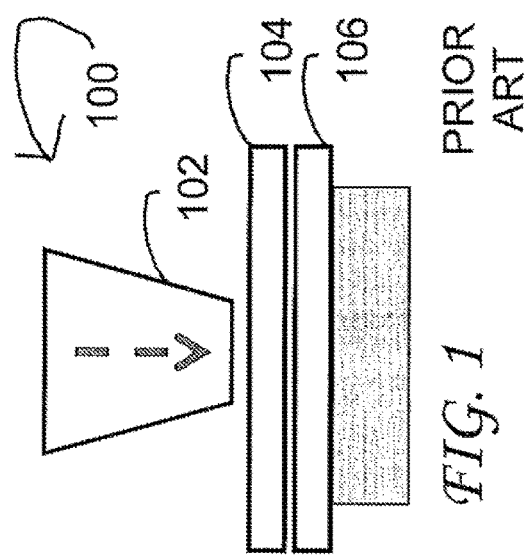
FIG. 2 shows the arrangement of FIG. 1 as welding is commenced.
Figure 3:
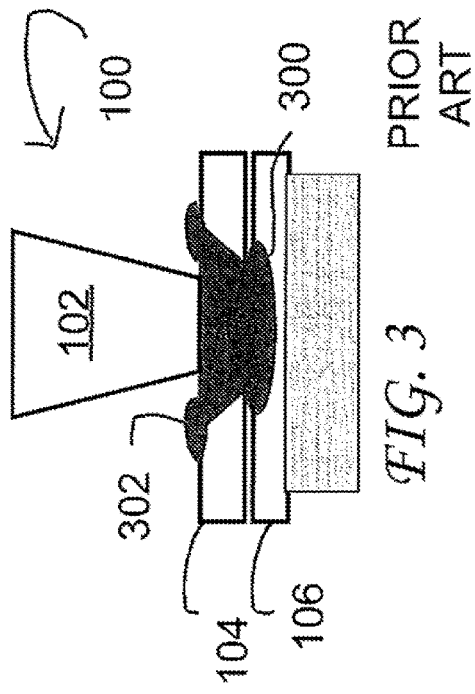
FIG. 3 shows the arrangement as welding is completed, and unwanted excessive, or squeeze-out, workpiece material formed.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like.

Applications can be implemented on various system configurations, including single-processor or multiprocessor systems, microprocessor-based electronics, combinations thereof, and the like. In certain embodiments, some or all operations (e.g., controlling horn application) are performed by, or at least initiated by a computing device, such as a processor executing computer-executable instructions stored or included at a computer-readable medium. And any one or more steps of the process can be performed, initiated, or otherwise facilitated by automated machinery, such as robotics.

I. General Overview of the Disclosure

The present disclosure describes a hybrid technique for joining workpieces, such as polymeric composites. The technology involves a hybrid joining technique including joining composites using a hybrid joining technique involving applying friction and ultrasonic energy to the workpieces being joined. The friction and ultrasonic operations can be performed in any order and at times simultaneously, according to embodiments of the technology. The result is a large and robust weld, especially as compared to conventional techniques.

While the descriptions, below, focus primarily on embodiments referred to in the Summary, above, as friction-assisted ultrasonic welding, the other embodiments described expressly and inherently herein are optional aspects of the present technology. The technology can be implemented as well according to other embodiments, such as the embodiments referred to in the Summary, above, as ultrasonic-assisted friction welding, ultrasonic-assisted friction stir welding, or the like. In all cases, the goal is to achieve large and robust welds, especially in comparison to the welds made by conventional techniques.

FIGS. 16-20 show the system being used according to embodiments in which the ultrasonic energy application is commenced first. Aspects of these embodiments can be varied, as described expressly and inherently herein. While the horn 406 is shown remaining in place in FIGS. 17 and 18, for example, the horn 406 could be withdrawn prior to or while the shaping tool 404 is being lowered or begins rotating. And while the horn 406 is shown emanating welding energy (e.g., high-frequency ultrasonic vibrations) in FIGS. 18 and 19, the horn 406 could be withdrawn at these stages, as mentioned, or still present in the lowered state, but not emanating the energy in association with FIG. 19, or with FIGS. 18 and 19. A contemplated benefit of leaving the horn 406 in place, even if it is not emanating energy, is that the horn 406 surface might function to keep molten workpiece material in place beneath the workpiece surface (see e.g., 1504 in FIG. 15) as desired during operation of the friction tool 404.

Further reference is now made to the afore-mentioned embodiment in which mechanically shaping of a proximate, first, workpiece, of the workpieces being joined, is performed, to facilitate effective and neat subsequent ultrasonic welding of the workpiece with another workpiece. By the shaping, one or more recesses are formed. The number of recesses, and their sizes, shapes, and positions are determined to facilitate welding in a predetermined manner. The recesses facilitate welding at least by accommodating molten workpiece material during welding.

It is also contemplated that, in some embodiments, welding is expedited by presence of the one or more recesses. In one case, for example, with at least one recess formed so that primary workpiece material remains directly below the ultrasonic horn, but at least some lateral workpiece material, adjacent the primary material, is removed, the ultrasonic vibrations to be emitted by the horn, and the heat generated thereby, will traverse more quickly to an interface between the pieces being joined, than it would if the adjacent material was not removed.

The mechanical shaping in some embodiments melts some of the workpiece material. Whether the mechanical shaping causes the workpiece material to actually melt, it will heat the workpiece material. If ultrasonic welding is commenced while the workpiece is still not, or at least not fully cooled, then this friction-induced pre-heating facilitates the ultrasonic welding. For instance, less ultrasonic energy is needed to melt pre-heated material.

The technique, whether the mechanical shaping causes the workpiece material to actually melt, can be referred to as a hybrid welding technique, including mechanical and ultrasound operations—the mechanical/friction-induced shaping, and possible melting, of the workpiece and the ultrasound-induced melting facilitated by said mechanical operations.

Other benefits include additional reduction of cycle, energy, and resources via obviation of any need to remove, from a proximate workpiece of the two being joined, excess workpiece material developing in an undesirable location position during welding, such as above a primary surface of the proximate workpiece.

Parts lacking excess material would be neater, and parts joined according to the present technology, requiring no excess-material removal, are expected to be cosmetically superior to parts joined under the traditional technique requiring removal.

It is also contemplated that a workpiece-to-workpiece connection according to the present technology could have a higher integrity or robustness than connections formed by conventional techniques. A connection being formed, or formed already, could be damaged by the conventional necessity to remove unwanted material from undesired locations. Upsetting a surface portion of a cooling or cooled material could, in addition to reducing cosmetic quality of the part, upset the connection. Rough handling or chipping off of excess material could also chip desired material and cause fractures in joint material. A fracture originating at the surface could propagate to the joint, or rough handling of the parts could cause unwanted inter-part movement, upsetting the joint.

By obviating the removal function altogether, the present technology thus saves time, energy, resources, and integrity of the resulting part or product.

Time and energy can also be saved in embodiments in which the workpiece is pre-heated by the workpiece shaping (e.g., friction). Less time and energy are required to melt the workpiece having been pre-heated as such.

The system components, algorithm, and operations are described further below with reference to figures.

II. Process, Tooling, and Workpieces—FIGS. 4-15

The present technology is now described with reference to example systems, tooling, and workpieces. The figures are referenced to facilitate understanding of the technology, and not to limit scope thereof.

Reference to directions herein, such as upper, lower, up, down, and lateral, are provided to facilitate description of the present technology but does not limit scope of the technology. A description in which a servo horn is described as descending down upon a proximate workpiece is not limited, for example, to the horn moving vertically downward in the earth, or environment, frame. The horn in this case can be moving from left to right, for example, in the environment frame.

Again, while the descriptions, below, focus primarily on embodiments referred to in the Summary, above, as friction-assisted ultrasonic welding, the other embodiments described expressly and inherently herein are optional aspects of the present technology. The technology can be implemented as well according to other embodiments, such as the embodiments referred to in the Summary, above, as ultrasonic-assisted friction welding, ultrasonic-assisted friction stir welding, or the like.

Turning again to the figures, and more particularly, the fourth figure, FIG. 4 shows schematically the new ultrasonic welding arrangement 400 prior to welding.

The arrangement 400 includes the two workpieces 104, 106 of FIG. 1 to be joined.

The workpieces 104, 106 can include any of various materials, and have any of a variety of shapes and sizes. In one example, the proximate workpiece 104 has a thickness (top to bottom thickness in the figures) of between about 0.5 mm and about 5 mm.

Regarding material, the workpieces 104, 106 can include similar or dissimilar materials compared to each other. Regarding dissimilar workpiece materials, one workpiece can be a plastic or other polymer, for instance, and the other can be steel, aluminum, an alloy, or other metal, etc. Thus, the teachings of the present disclosure can be used to join a polymer (e.g., polymeric composite) to another polymer, or to join a polymer to a metal, for instance.

In one embodiment, the material 104, 106 includes polyethylene. In one embodiment, the material includes polyethylene terephthalate (PET), high density polyethylene (HDPE) and/or ethylene vinyl alcohol (EVOH).

In one embodiment, at least one of the workpieces 104, 106 being joined includes a polymer. At least one of the workpieces 104, 106 can include synthetic, or inorganic, molecules. While use of so-called biopolymers (or, green polymers) is increasing, petroleum based polymers are still much more common.

Material of one or both workpieces 104, 106 may also include recycled material, such as a polybutylene terephthalate (PBT) polymer, which is about eighty-five percent post-consumer polyethylene terephthalate (PET).

In one embodiment one or both of the workpieces 104, 106 includes some sort of plastic. In one embodiment, the material includes a thermo-plastic.

In one embodiment one or both of the workpieces 104, 106 includes a composite. For example, in one embodiment one or both of the workpieces includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite.

The material of the workpieces 104, 106 in some implementations includes a polyamide-grade polymer, which can be referred to generally as a polyimide.

Material of one or both workpieces 104, 106 may also include includes polyvinyl chloride (PVC).

In one embodiment, the material of the workpieces 104, 106 includes acrylonitrile-butadiene-styrene (ABS).

In one embodiment, the material of the workpieces 104, 106 includes a polycarbonate (PC).

Material of one or both workpieces 104, 106 may also comprise a type of resin. Example resins include a fiberglass polypropylene (PP) resin, a PC/PBT resin, and a PC/ABS resin.

The workpieces 104, 106 may be pre-processed, such as heated and compression molded prior to the welding.

The arrangement 400 further includes hybrid tooling 402 comprising a shaping tool 404 surrounding an ultrasonic-energy applicator, or horn 406. One or both workpieces 104, 106 may be supported, at least in part, by a supporting structure, or supporting force 408.

The shaping tool 404 is configured in any appropriate manner for performing the shaping functions described herein. In one embodiment, shaping-tool functions include primarily creating at least one slot, hole, recess, or other void in the proximate workpiece 104.

In one embodiment, the shaping tool 404 is primarily mechanical-based. A mechanical configuration can be configured to create the slot or void by way of friction, pressure, impression, cutting, or any combination of these, for instance.

For embodiments in which the material is removed to form the slot by friction, the shaping tool 404 may be referred to as a friction tool. Workpiece material can be displaced, or removed, by movement of the tool 404 in response to direct tool-to-workpiece contact, or friction, and possibly also by heat generated by the friction.

As one benefit of the present technology, overall welding cycle time saved, and process efficiency, improved because heat is generated in the workpiece due to the—e.g., friction caused by the shaping tool on the workpiece. Less energy is required to melt the workpiece pre-heated as such, and so the welding process is expedited. Energy, e.g., electrical energy is also saved as an amount of ultrasonic power needed is reduced when the part is pre-heated.

The shaping tool 404 of FIG. 4 is of this mechanical-based type. The illustrated tool 404 is described further below in connection with FIGS. 5-8.

According to another, contemplated, embodiment, the shaping tool 404 is light-based, such as a tool using a LASER. The tool 404 is configured to create a slot or void by displacing and/or removing material of the workplace 104 using light-based (e.g., LASER) energy.

In another contemplated embodiment, the shaping tool 404 is configured to apply heat to the workpiece to form a slot by burning workpiece material. The tool 404 could include, e.g., an electrode or quick-heating iron. In a further contemplated embodiment, the tool 404 is configured to, or connected to a device configured to, vacuum the material as it is being melted or burned to form the slot. In another contemplated implementation, the heat is sufficient to burn, or char, the material so that the slot is formed as desired without development of excess material above the surface of the workpiece 104. The burning may, for instance, evaporate some of the workpiece material to form the slot.

FIG. 5 shows a top, plan view of the hybrid tooling 402 of FIG. 4. As shown, the shaping tool 404 surrounds the ultrasonic horn 406. In one embodiment, the components

404, 406 are positioned adjacent each other slidably, so that each can move with relative ease with respect to the other 406, 404.

In one embodiment, the relative configuration allows the relative movement in the vertical direction. This flexibility allows, for instance, the shaping tool 404 to be lowered and raised with respect to the horn 406 and the proximate workpiece 104, and the horn to be lowered and raised with respect to the proximate workpiece 104, as described further below in connection with FIGS. 6, 8-11, and 15.

In one embodiment, the relative configuration allows the shaping tool 404 and the ultrasonic horn 406 to move with respect to each other in one or more directions in addition to or other than vertical. In a first particular embodiment, the configuration allows the shaping tool 404 to rotate with respect to the horn 406 and the proximate workpiece. In a second particular embodiment, in which there is no relative rotational movement between the shaping and horn tools 404, 406, the two rotate together with respect to the workpiece 104 to form the slot (704 in FIG. 7). Though these two embodiments differ, the illustration of FIG. 7 is considered to show schematically operation under each of these two embodiments toward forming the slot shown in FIG. 9.

With further reference to FIGS. 4 and 5, the horn 406 is shown having a generally cylindrical shape, and circular top cross section, and the shaping tool 404 having an annular top profile. Shape of the horn is not limited to this shape, and the horn may include any appropriate shape of a wide variety of shapes.

Contemplated alternative shapes include a tall block having an oval, square, or other rectangular top profile. For these non-circular embodiments, the workpiece slot would not be formed by rotation of the tool 404, but rather pressure, or impression, for instance.

With continued reference to the figures, FIG. 6 shows the arrangement 400 of FIG. 4 indicating by arrows 600, a first operation whereby the shaping tool, or shoulder 404, is lowered with respect to the horn 406 and with respect to the proximate workpiece 104.

In a contemplated embodiment, for facilitating the relative shoulder-to-horn motion, the shoulder 404 and horn 406 include corresponding track elements (not shown in detail). One may include a relatively-small elongated protrusion while the other includes a small vertical groove configured to slidably receive the protrusion. For this embodiment, the shoulder 404 and horn 406 would rotate together in the operation of FIG. 7.

In some embodiments, the shaping tool 404 and/or the ultrasound horn 406 are configured and/or arranged in one or more ways to ensure the ultrasonic functions are not hindered by the horn 406 contacting the tool. In one embodiment, the components 404, 406 are separated by a small gap or space, least when and where the ultrasound is being transmitted.

In another embodiment, one or both components 404, 406 includes insulation, such as an external/surface, or slightly internal, vibration-prohibitive insulating layer.

In still another embodiment, the components 404, 406 are separated by a material, such as a fluid that inhibits transfer of ultrasonic vibrations from the horn to the shaping tool. In a particular embodiment, the material also acts as a lubricant (e.g., fluid or dry/solid lubricant) between the components 404, 406, facilitating relative movement between the two 404, 406 (e.g., FIGS. 6, 7, 8, 10, and 15). In a contemplated embodiment, the arrangement includes one or more seals to encase the separating material, keeping it between the components 404, 406.

As referenced, and any of the operations can be performed, initiated, or otherwise facilitated by automated machinery, such as robotics. Regarding the operation indicated by FIG. 6, for example, a robot (not shown in detail) can be configured and arranged (e.g., connected to the shoulder 404) to control the lowering of the shoulder 404. The robot can be automated or controlled by automation embodied in, e.g., a computer or other electronic controller (not shown).

The controller, in one embodiment, includes a tangible computer readable storage device, or memory. The memory is programmed with (i.e., stores) computer-executable instructions, or code, that, when executed by a processor, such as a processor of the controller, causes the processor to initiate and control motion of the shaping tool 404.

The controller controls a downward movement of the shaping tool 404, a total distance, or displacement, of the movement, and a velocity, or rate of displacement and direction (e.g., down or up).

In one contemplated embodiment, at least one movement of at least of the shaping tool 404 and the horn 406 is controlled manually. One or both may be controlled, e.g., by motion initiated by personal force—e.g., force of personnel in a manufacturing plant.

With continued reference to the figures, FIG. 7 shows by arrow an embodiment in which, as reference above, either the shaping tool 404 is moved with respect to the horn 406 and proximate workpiece 104, or both components 404, 406 are moved together with respect to the workpiece 104.

Shaping-tool movement is indicated by rotation arrow 700. The rotating, as with all tooling 400 robotics, or other automated machinery, and a controller, as reference above regarding lowering the shaping tool 404 to the proximate workpiece 104.

In one embodiment, rotation of the shaping tool 404 is started after the workpiece has been brought into contact with the proximate workpiece 104. In another embodiment, the rotation is started before the shaping tool 404 first contacts the workpiece 104.

While a tip 702 of the shaping tool 404 is shown schematically having a squared profile in FIGS. 4 and 6-15, the tips may have any appropriate shape for performing the functions, and accomplishing the goals, described herein. Instead of having the squared profile shown, the tips are, in one embodiment, more pointed (not shown in detail). In one embodiment, the point is formed by an angled line meeting a vertical side of the shaping tool to form the point, or by two angled line meeting to form the point.

The tool 404 is configured (e.g., size, shape, and material) and used to shape, or shape and melt, the proximate workpiece 104 as desired according to applicable tribological principles.

In a contemplated embodiment, the shaping tool 404 has one or more discontinuities at its lower edge. The lower edge may include, for instance, sharp protrusions and/or recesses or gaps. The arrangement in some cases could form teeth, such as teeth of a saw. The tool 404 may include, or have one or more features analogous to, an annular cutter, drill, or router.

In one embodiment, the system includes a workpiece-removal sub-system (not shown in detail). The sub-system is configured and arranged adjacent the tool 404 and proximate workpiece 104 to move displaced workpiece material (e.g., workpiece material cut or scratched off, but not melted) away from the tool 404 and workpiece 104. The sub-system can include, e.g., positive and/or negative air flow elements, such as a focused blower and/or suction or vacuum elements.

In one embodiment, the shaping tool 404 is lowered as it is rotating. By this dual-direction motion, the shaping tool 404 at least initially cuts or scrapes away workpiece material as it is lowered to contact the workpiece 104.

As provided, the shaping tool 404 in one embodiment is lowered onto the proximate workpiece 104 with force sufficient to make an impression, or indentation in the workpiece, without, or at least before, any rotating of the tool 404. In a contemplated case, the tool 404 is configured, arranged, and moved past an initial contact with the workpiece 104 in order to, without tool rotation, form the depression, or slot—e.g., slot 704 shown in FIG. 7. In another contemplated embodiment, the shaping tool 404 is configured, arranged, and operated to form the slot 704 by such pressure being applied while the tool 404 is emanating at least a low level of heat.

The shaping tool 404 may include any of a variety of materials without departing from the scope of the present technology. In one embodiment, the tool 404 is steel or another metal. Generally, the shaping tool 404 includes a material that is harder than that of the proximate workpiece 104.

Continuing with reference to the figures, as provided, FIG. 7 shows the arrangement 400 after the shaping tool 404 has been used, according to embodiments described, to create the slot 704.

The slot 704 has a shape corresponding to a configuration of at least the shaping tool 404. For instance, in embodiments in which the tool 404 has an annular top profile, such as that shown in FIG. 5, the resulting slot 704 will have a similar profile.

The operation includes continuing to rotate and lower the shaping tool 404. The tool is lowered to a desired depth, or vertical displacement.

As the shaping tool 404 continues to be rotated and lowered, the workpiece 104 begins to heat locally due to the friction. In some embodiments, the workpiece 104 is heated to such a degree at this stage that the workpiece 104 begins to melt. Friction-generated molten material is indicated in FIG. 8 by reference numeral 800.

The amount of friction required to accomplish workpiece 104 melting corresponds proportionally to a melting point of the workpiece 104. Relatively little friction would be required for a workpiece having a relatively low melting point. In one embodiment, one, or both, of the workpieces 104, 106 has a melting point between about 150° and 300° C. Workpiece 104, 106 materials are described further below.

Various system and operating characteristics are set to achieve desired results. The characteristics can affect each other in various ways. For instance, an amount of friction-generated molten material 800 created is affected by variables including the depth, or displacement, to which the tool 404 is lowered while rotating, tool 404 material and shape/geometry (e.g., hardness, whether toothed, etc.), workpiece 104 material (e.g., melting point and thermal conductivity), the speed at which the tool is lowered, etc.

An amount of time that the tool 404 is lowered and rotated can depend on the speed that the tool will be rotated, tool 404 material and shape/geometry (e.g., hardness, whether toothed, etc.), workpiece 104 material (e.g., melting point and thermal conductivity), the speed at which the tool is lowered, an amount of workpiece 104 material desired to be removed and melted, a desired configuration (e.g., size and shape) of any desired friction-induced weld nugget, etc. Other such relationships will be apparent to one skilled in the art executing the technology taught herein.

As shown in FIG. 8, the workpiece can melt down all the way to an interface 802 between the workpieces 104, 106. If hot enough, the melted proximate-workpiece material 800 can initiate melting of top surface material of the distal workpiece 106.

Even if the melted material 800 of the proximate workpiece 104 only reaches the interface and contacts the surface of the distal workpiece 106, a friction-generated weld 800 joining the workpieces 104, 106 is formed.

FIG. 8 also shows a subsequent step of retrieving the shaping tool 404 from the proximate workpiece 104. The retrieval is indicated by up arrow 801.

FIG. 9 shows the arrangement 400 after the slot 704 has been formed (FIG. 7), and the shaping tool 404 withdrawn (FIG. 8).

Figure 10:
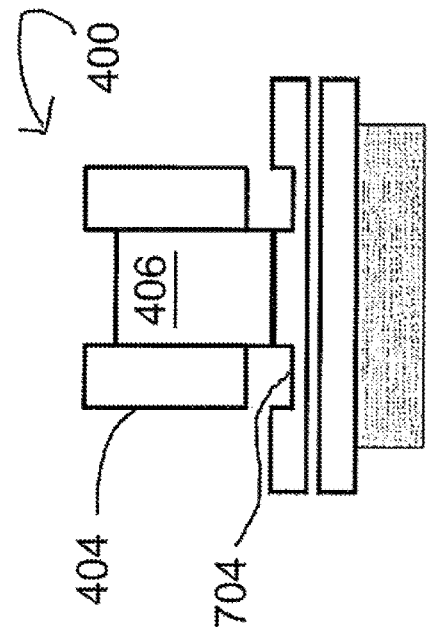
FIG. 10 shows the arrangement after the operation of FIG. 8, and indicates a subsequent operation whereby the ultrasonic welding horn is lowered to the proximate piece for welding.
Figure 11:
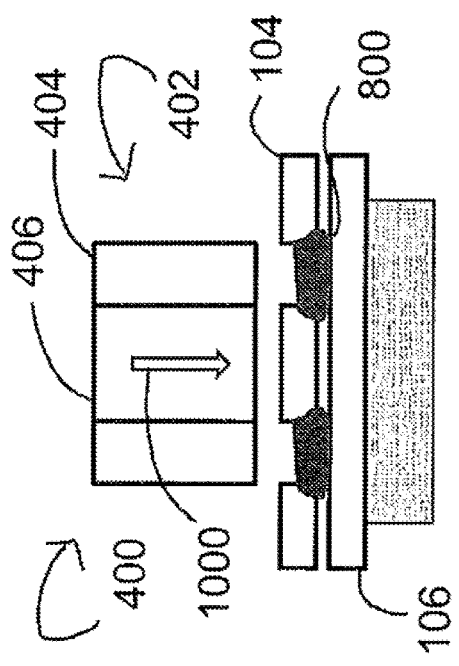
FIG. 11 shows the arrangement after the operation of FIG. 10, wherein the horn has reached the proximate piece, just prior to commencement of welding.

FIG. 10 shows the arrangement 400 after the operation of FIG. 8, and indicates by arrow 1000 a subsequent operation whereby the ultrasonic welding horn 406 is lowered to contact the proximate workpiece 104, as shown in FIG. 11.

The horn 406 can be lowered, and the subsequent ultrasonic welding (FIG. 11) commenced at any of various timings with respect to the tool 404 completing its work on the workpiece(s). In one embodiment, the horn 406 is lowered to contact the proximate workpiece 104 while the tool 404 is still rotating and in contact with the workpiece(s), for example. In another case, the horn 406 is lowered to contact the workpiece 104 immediately after the tool 404 has stopped rotating and is about to be lifted. In another case, the horn 406 is lowered to contact the workpiece 104 while the tool 404 is being lifted or immediately after the tool 404 has been lifted.

In one contemplated case (not shown in detail), the horn 406 is lowered to contact the workpiece 104 before tool 404 starts rotating in the first place. The horn 406 can be lowered with the tool 404 in FIG. 6, for instance, and remains down in the steps shown by FIGS. 7 and 8.

Once the horn 406 is in contact with the proximate workpiece 104, an ultrasonic generator connected to the horn 406 excites high-frequency (HF) ultrasonic vibrations. The vibrations are passed through the horn 406 to the proximate workpiece 104, as indicated by reference numeral 1200 in FIG. 12.

Figure 12:
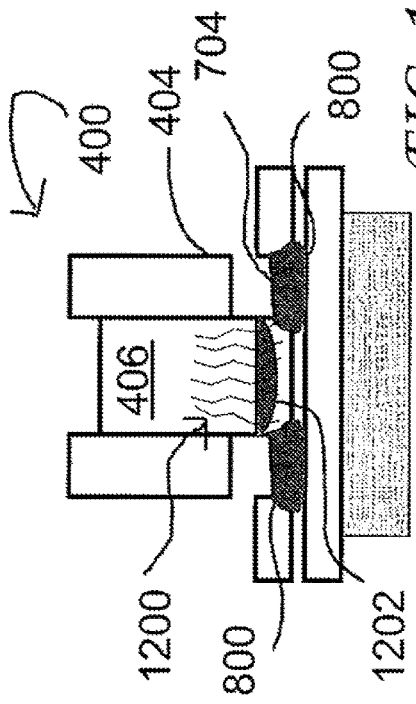
FIG. 12 shows the arrangement after the operation of FIG. 10 and after welding has commenced.

As the workpiece 104 receives the vibrations 1200, the excitement generates heat in the workpiece, causing the workpiece 104 to melt 1202, as also shown in FIG. 12. As provided, in one embodiment, one, or both, of the workpieces 104, 106 has a melting point between about 150° and 300° C.

Once the shaping tool 404 stops rotating, heating of the workpiece(s) caused by the tool 404 will naturally cease. If there is a small window of time between the tool 404 stopping and application of ultrasonic vibrations, the friction-generated molten material 800 and surrounding workpiece material will naturally cool some. When this window is smaller, the friction-generated molten material 800 and surrounding workpiece material will cool less.

In any event, even if the friction generated by the tool 404 is not designed to create any molten material, it is preferred for most cases that window be small enough to ensure that some heat remains in the workpiece(s) when the ultrasound is started. The pre-heating has various benefits. A primary benefit is that less ultrasonic energy will be required to melt the workpiece material beneath the horn 406. The pre-heating results in a savings of energy at this stage, and the ultrasonic features can be used for a shorter period of time than if there were no pre-heating.

In one embodiment, the horn 406 is configured (e.g., by weight or spring load) and/or controlled to apply a downward force on the workpiece 104 during the welding. Thus, as the workpieces melt due to the ultrasonic vibrations, the horn 406 lowers some.

FIG. 13 shows the arrangement after the operation of FIG. 12, after sufficient welding is performed to cause vibration-melted workpiece material 1202 to begin to fill any space 704 created by the shaping tool 404. For embodiments in which the friction generated by rotation of the shaping tool 404 created molten material 800, the growing vibration-melted material 1202 eventually meets or joins with the friction-melted material 800, as shown in FIG. 13.

If the vibration-melted material 1202 is energized (e.g., heated) enough, the material 1202 can heat any cooled friction-melted material 800, re-melting any of it 800 if it had cooled and/or causing any workpiece material adjacent the previously-melted material 800 to melt.

In some embodiments, a single robust weld 1400 is formed, as shown in FIG. 14. As also shown in FIG. 14, as the ultrasonic welding is continued, molten workpiece 104 material begins to fill substantially most of the space 704 formed by the operation (FIG. 7) of the shaping tool 404. As also shown in FIG. 14, the molten material reaches the interface 1400 between the parts 104, 106, for forming the weld joint.

FIG. 15 shows the arrangement upon completion of the welding and a retrieval action, indicated by upward arrow 1500, of the ultrasonic weld from the workpieces joined.

For embodiments in which a completely flat resulting surface is desired, the process described results, optimally, in a processed (heated and cooled) material surface 1502 that is substantially flush with the adjacent non-processed material 1504, as shown in FIG. 15. For this and each embodiment, a desired cosmetic quality of the resulting product is achieved.

The welding process is configured to form the desired resulting finish. Example variables include, for instance, a shape and size of the horn 406, a level of HF vibration applied, an amount of time that the welding energy is applied, a downward force of the horn, and a resulting downward displacement of the horn in the welding.

In the contemplated embodiment, described above, in which the horn 406 moves down during welding, the variables are configured so that the desired surface finish, e.g., the flush finish mentioned, is formed. The horn 406 could during welding create a void into which a small amount of excess workpiece 104 material would fill when the horn is retrieved as shown by arrow 1500 in FIG. 15.

III. Various Features of the Technology

Some but not all of the benefits, advantages, motivations, and results of the present technology are described above, and some but not all of these are described in this section.

A hybrid friction and ultrasonic joining method to achieve high quality welds in joining multiple fiber-reinforced polymeric composites.

Benefits include reduced cycle time and improved process efficiency, cycle time, and joint quality.

Time is saved, and so process efficiency improved by, for instance, by obviating need to remove unwanted supra-surface molten, or melted and cooling or cooled workpiece material—e.g., workpiece material melted and present undesirably above the surface 1504.

Time is also saved, and process efficiency improved because heat is generated in the workpiece due to the—e.g., friction caused by the shaping tool on the workpiece. Less energy is thus required to melt by ultrasound the workpiece material that is adjacent the material pre-heated by friction, whether the friction-heated material becomes or remains molten due to the friction—so long as the friction-heated material is warmed above a base temperature (e.g., room, ambient, or environmental temperature) at which the workpiece material would be at without application of the friction.

So, generally, the ultrasonic welding stage is shortened compared to the time it would take without the friction-induced pre-heating. Energy, e.g., electrical energy is also saved as an amount of ultrasonic power needed is reduced when the workpiece is pre-heated.

Time might also be saved by the HF-vibration and heat channeling occasioned by selectively removing workpiece material. The high-frequency (HF) vibrations emitted by the horn, and resulting heat, might be channeled more quickly through the primary material, below the horn, to an interface between the workpieces being joined, than it would if adjacent workpiece material had not been removed.

Joint quality, including integrity or robustness, is also improved. According to the present technologies, connections formed or being formed are not damaged by the conventional necessity to remove unwanted workpiece material. There is no risk, then, of upsetting a surface portion of a cooling or cooled, and so of reducing cosmetic quality.

The resulting weld joint is also larger than the weld would be is formed by the same horn and ultrasonic energy if no pre-friction shaping were performed.

Obviating the need to remove material also eliminates a risk of affecting a balance of the cooling or cooled material adjacent the extra material. As mentioned, in conventional systems, there is a chance that, by upsetting a surface portion of the cooling or cooled material, such as by rough removal of the excess (e.g., chipping at hardened material), effects could transfer through the workpiece to also upset an integrity of the weld and possibly affecting cosmetics of the resulting product.

The benefits make welding in an assembling environment much more cost effective, and manufacturing of lightweight parts and products (e.g., vehicles) more cost effective and results in better products.

IV. Conclusion

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method, for efficiently joining together multiple workpieces, of a workpiece arrangement, while inhibiting incursion of weld material into one or more unwanted areas of the arrangement, comprising:
positioning a hybrid shaping-and-energizing system comprising a shaping tool and ultrasonic horn proximate a workpiece, the shaping tool being movably connected to the ultrasonic horn;
forming, using the shaping tool, at least one recess in the proximate workpiece of the workpiece arrangement; and
applying, using the ultrasonic horn, weld energy to the proximate workpiece of the workpiece arrangement;
wherein the recess is formed, and weld energy applied, so that molten workpiece material becomes disposed within the recess, thereby inhibiting formation of weld material in the unwanted areas.

2. The method of claim 1, wherein:
forming the recess includes rotating the shaping tool while the shaping tool is in contact with the proximate workpiece to generate sufficient friction to create the recess, being an annular recess; and
the shaping tool is positioned around the ultrasonic horn.

3. The method of claim 1, wherein automated machinery controls one or more functions of the method.

4. The method of claim 1, wherein:
a first workpiece and a second workpiece of the workpiece arrangement have dissimilar material; and
at least one of the workpieces includes polymer.

5. The method of claim 1, wherein the shaping tool is spaced from ultrasonic horn, defining an intervening gap, when the ultrasonic horn is positioned for applying ultrasonic vibrations, to inhibit transmission of vibrations from the ultrasonic horn to the shaping tool.

6. The method of claim 1, wherein:
in forming the recess using the shaping tool, material of the proximate workpiece to heat up; and
the heating of the proximate workpiece facilitates welding in applying the weld energy to the proximate workpiece.

7. The method of claim 1, wherein:
in forming the recess using the shaping tool, material of the proximate workpiece to heat and partially melt the proximate workpiece;
the applying is performed in a welding operation; and
the heating and melting of the proximate workpiece facilitates ultrasonic welding operation.

8. The method of claim 1, wherein the tool and applicator are configured, arranged, and controlled according to a manner selected from a group consisting of:
being configured, arranged, and controlled so that operation of the ultrasonic horn to apply weld energy is commenced after commencement of operation of the shaping tool to generate heat in the workpiece by friction;
being configured, arranged, and controlled so that operation of the ultrasonic horn to apply weld energy is commenced before commencement of operation of the shaping tool to generate heat in the workpiece by friction;
being configured, arranged, and controlled so that operation of the ultrasonic horn to apply weld energy is commenced after conclusion of operation of the shaping tool to generate heat in the workpiece by friction; and
being configured, arranged, and controlled so that operation of the shaping tool to generate heat in the workpiece by friction is commenced after conclusion of operation of the ultrasonic horn to apply weld energy.

9. The method of claim 1, wherein:
forming the recess generates heat in the proximate workpiece, melting workpiece material; and
applying the weld energy using the ultrasonic horn is commenced according to a timing selected from a group of timings consisting of:
after commencement of forming the recess and melting the workpiece by friction;
before commencement of forming the recess and melting the workpiece by friction;
after conclusion of forming the recess and melting the workpiece by friction; and
after conclusion of applying the weld energy using the ultrasonic horn.

10. A method, for efficiently joining together multiple workpieces, of a workpiece arrangement, while inhibiting incursion of weld material into one or more unwanted areas of the arrangement, comprising:
positioning a hybrid shaping-and-energizing system comprising a shaping tool and ultrasonic horn proximate a workpiece, the shaping tool being movably connected to the ultrasonic horn;
forming, using the shaping tool, at least one recess in a proximate workpiece of the workpieces to be joined; and
applying, using the ultrasonic horn, weld energy to the proximate workpiece, wherein the weld energy causes at least a portion of the proximate workpiece to form molten material that is disposed within the at least one recess, thereby inhibiting formation of weld material in the unwanted areas.

11. The method of claim 10, wherein:
forming the recess includes rotating the shaping tool while the shaping tool is in contact with the proximate workpiece to generate sufficient friction to create the recess, being an annular recess; and
the shaping tool is positioned around the ultrasonic horn.

12. The method of claim 10, wherein automated machinery controls one or more functions of the method.

13. The method of claim 10, wherein:
a first workpiece and a second workpiece of the workpiece arrangement have dissimilar material; and
at least one of the workpieces includes polymer.

14. The method of claim 10, wherein the shaping tool is spaced from ultrasonic horn, defining an intervening gap, when the ultrasonic horn is positioned for applying ultrasonic vibrations, to inhibit transmission of vibrations from the ultrasonic horn to the shaping tool.

15. The method of claim 10, wherein:
in forming the recess using the shaping tool, material of the proximate workpiece to heat up; and
the heating of the proximate workpiece facilitates welding in applying the weld energy to the proximate workpiece.

16. The method of claim 10, wherein:
in forming the recess using the shaping tool, material of the proximate workpiece to heat and partially melt the proximate workpiece;
the applying is performed in a welding operation; and the heating and melting of the proximate workpiece facilitates ultrasonic welding operation.

17. The method of claim 10, wherein the tool and applicator are configured, arranged, and controlled according to a manner selected from a group consisting of:
being configured, arranged, and controlled so that operation of the ultrasonic horn to apply weld energy is commenced after commencement of operation of the shaping tool to generate heat in the workpiece by friction;
being configured, arranged, and controlled so that operation of the ultrasonic horn to apply weld energy is commenced before commencement of operation of the shaping tool to generate heat in the workpiece by friction;
being configured, arranged, and controlled so that operation of the ultrasonic horn to apply weld energy is commenced after conclusion of operation of the shaping tool to generate heat in the workpiece by friction; and
being configured, arranged, and controlled so that operation of the shaping tool to generate heat in the workpiece by friction is commenced after conclusion of operation of the ultrasonic horn to apply weld energy.

18. The method of claim 10, wherein:
forming the recess generates heat in the proximate workpiece, melting workpiece material; and
applying the weld energy using the ultrasonic horn is commenced according to a timing selected from a group of timings consisting of:
after commencement of forming the recess and melting the workpiece by friction;
before commencement of forming the recess and melting the workpiece by friction;
after conclusion of forming the recess and melting the workpiece by friction; and
after conclusion of applying the weld energy using the ultrasonic horn.

19. A method, for efficiently joining together multiple workpieces, of a workpiece arrangement, while inhibiting incursion of weld material into one or more unwanted areas of the arrangement, comprising:
positioning a hybrid shaping-and-energizing system comprising a shaping tool and ultrasonic horn proximate a workpiece, the shaping tool being movably connected to the ultrasonic horn;
forming, using the shaping tool, at least one recess in a proximate workpiece of the workpieces to be joined, wherein the shaping tool causes a portion of the proximate workpiece within the recess to form molten material that becomes disposed within the; and
applying, using the ultrasonic horn, weld energy to the proximate workpiece adjacent the recess, wherein the weld energy causes the proximate workpiece to form molten material that that joins the molten material disposed within the recess, thereby inhibiting formation of weld material in the unwanted areas.

20. The method of claim 19, wherein:
applying the weld energy using the ultrasonic horn is commenced according to a timing selected from a group of timings consisting of:
after commencement of forming the recess and melting the workpiece by friction;
before commencement of forming the recess and melting the workpiece by friction;
after conclusion of forming the recess and melting the workpiece by friction; and
after conclusion of applying the weld energy using the ultrasonic horn.

* * * * *